United States Patent Office" 3,471,489
Patented Oct. 7, 1969

3,471,489
1,2,3-BENZOTRIAZIN-4(3H)-ONES
Raymond H. Rigterink, Midland, Mich., assignor to The Dow Chemical Company, Midland, Mich., a corporation of Delaware
No Drawing. Continuation-in-part of application Ser. No. 535,351, Mar. 18, 1966. This application July 29, 1968, 748,191
Int. Cl. C07d 55/08; A01n 9/22; A61k 27/00
U.S. Cl. 260—248                                8 Claims

ABSTRACT OF THE DISCLOSURE

Disclosed are, as new compounds, 4-oxo-1,2,3-benzotriazin-3(4H)-ylmethyl carbamates and substituted derivatives thereof which are useful as insecticides, central nervous system depressants, and herbicides and certain useful intermediates for their preparation.

---

This is a continuation-in-part of my copending application identified as Ser. No. 535,351, filed Mar. 18, 1966, now abandoned.

The present invention is concerned with a heterocyclic compound of the formula

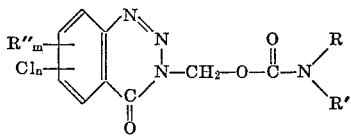

In the above and succeeding formulae, R represents a member selected from the group consisting of hydrogen, alkyl, and cyclohexyl; R' represents a member selected from the group consisting of R and phenyl; each R" independently represents a member selected from the group consisting of loweralkyl, loweralkoxy, halo, and nitro, and $n$ represents an integer independently selected from the group consisting of 0, 3, and 4, wherein $n$ being an integer other than 0, $m$ represents 0, and $n$ being 0, $m$ represents an integer of from 0 to 2, both inclusive. Hence, the above structural formula designates two groups of compounds, those in which the benzotriazine ring bears from 3 to 4 chlorine atoms as substituents:

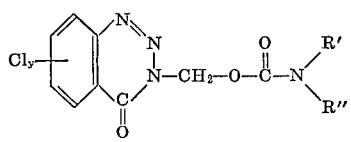

wherein $y$ represents 3 or 4, and those in which the benzotriazine ring is unsubstituted or bears from 1 to 2 substituents;

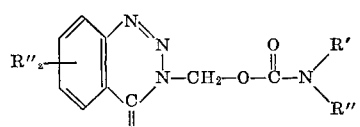

wherein $z$ represents 0, 1, or 2. In the present specification and claims, the terms "loweralkyl" and "loweralkoxy" are employed to designate alkyl and alkoxy, respectively, radicals being of from 1 to 4, both inclusive, carbon atoms; the term "alkyl" is employed to designate alkyl radicals being of from 1 to 8, both inclusive, carbon atoms; and the term "halo" is employed to designate appearances of bromo, chloro, and iodo, only.

Typically, the products of the present invention are crystalline solid materials. They are useful as toxic agents for the control of a wide variety of insects such as flies, beetles, American cockroaches, mosquitoes, mites and so forth. Those compounds wherein $n$ represents 0 and the substituents on the carbamate nitrogen atom are not spatially bulky, such as methyl, ethyl, and isopropyl, are active as central nervous system depressants, and thus exhibit tranquilizing, muscle relaxant, and anticonvulsant activity. In addition, products wherein at least one of R' and R" represents a relatively bulky group spatially, such as t-butyl, cyclohexyl, phenyl, isooctyl, and so forth, and especially those wherein, in addition, the benzotriazine ring bears from 1 to 4 chlorine substituents are useful as herbicides for the control of undesirable vegetation such as pigweeds, bindweeds, and so forth.

All of the products of the present invention are prepared by a two-step reaction which comprises, in the first step, treating a substituted methanol compound of the formula

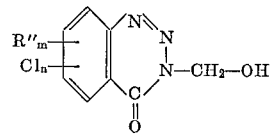

with phosgene to procure an intermediate chloroformate:

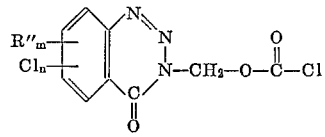

which, in the second step, is treated with an amine compound of the formula

to obtain the desired heterocyclic compound of the present invention.

The reactions are conveniently carried out by contacting the respective reactants together, preferably in the presence of a hydrogen chloride acceptor. Organic tertiary amines are suitable as hydrogen chloride acceptors; however, in the instance of the second reaction step, an excess portion of the amine reactant is also suitable as hydrogen chloride acceptor and its use is generally more convenient than the use of an organic tertiary amine. The reactions are conveniently carried out in an inert liquid reaction mixture, preferably an organic liquid. Suitable such organic liquids include hydrocarbons, such as benzene and toluene; chlorinated hydrocarbons, such as chloroform; ketones, such as acetone and isobutyl methyl ketone; dimethylformamide; acetonitrile; and ethyl acetate.

The reactions go forward readily at temperatures of from −40 to 10° C. The reactions can be conducted under pressures which are subatmospheric or superatmospheric, but no advantage is generally gained by such operation; therefore, the reaction is ordinarily conducted at atmospheric pressures.

The reactions proceed with the production of some of the desired product when the reactants are employed in any amounts. However, when it is desired to obtain good yields, it is preferred to employ the reactants in approximately those amounts which are consumed in the given reaction. In the first reaction step, equimolecular proportions of phosgene, substituted methanol compound, and hydrogen chloride acceptor are consumed. In the second reaction step, equimolecular proportions of chloroformate intermediate, amine compound, and hydrogen chloride acceptor are consumed; or, if excess amine compound is employed as hydrogen chloride acceptor, the reaction consumes one molecular proportion of chloroformate intermediate and two molecular proportions of amine compound.

In carrying out each of the reaction steps, the reactants are mixed and contacted together in any manner, conveniently by adding one reactant to the other reactant in the presence of inert liquid reaction medium and the hydrogen chloride acceptor. Thereafter, the resulting reaction mixture can be maintained for a period of time in the reaction temperature range to complete the reaction, although the reaction ordinarily goes to completion with the completion of the contacting together of the reactants. Each of the reaction steps results in the preparation of a by-product which appears as the hydrochloride salt of the hydrogen chloride acceptor employed. The by-product of the first reaction step can be removed prior to conducting the second reaction step, typically by washing with water, or can be permitted to remain in the reaction mixture, without harm, during the course of the second reaction step.

Following completion of both steps, the product is separated from the reaction mixture. The separation is carried out by means of conventional procedures. Typically, the by-product salts are removed by washing with water and the liquid employed as reaction medium is removed by evaporation under subatmospheric pressures. The resulting product residue can be purified, if desired, by means of such conventional procedures as recrystallization.

Certain of the products of the present invention are also prepared in an alternate method. In this method, suitable for those products wherein one of R and R' represents hydrogen and the other represents alkyl or cyclohexyl, an isocyanate:

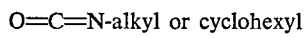

is reacted with the substituted methanol compound as previously defined

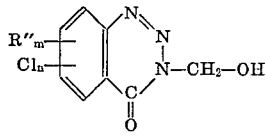

The reaction is preferably carried out in the presence of a small catalytic amount of a trialkylamine, such as triethylamine, and in an inert liquid reaction medium of the sort described hereinabove for the first synthesis method.

The reaction goes forward under temperatures of from 0 to 150° C., but is preferably carried out at temperatures of from 20 to 65° C. The reaction can be conducted under pressures which are subatmospheric or superatmospheric, but no advantage is generally gained; therefore, the reaction is ordinarily conducted at atmospheric pressures.

The reaction proceeds with the production of some of the desired product when the reactants are employed in any amounts. However, when it is desired to obtain good yields, it is preferred to employ the reactants in amounts representing equimolecular proportions or an excess of the isocyanate.

In carrying out the reaction, the reactants are mixed and contacted together in any manner, conveniently by adding one reactant to the other in inert liquid reaction medium. Thereafter, the resulting reaction mixture can be maintained for a period of time in the reaction temperature range to complete the reaction, although the reaction ordinarily goes to completion with the completion of the contacting together of the reactants.

Separation, and if desired, purification, are carried out in conventional procedures. Typically, the reaction mixture is removed by evaporation under subatmospheric pressure to obtain the product as a residue, which is then recrystallized from a solvent of the type employed as reaction medium.

The following examples illustrate the best manner now known for the practice of the present invention and will enable those skilled in the art to practice the present invention.

EXAMPLE 1.—((4 - OXO - 1,2,3 - BENZOTRIAZIN - 3 (4H)-YL)METHYL)ETHYLCARBAMATE

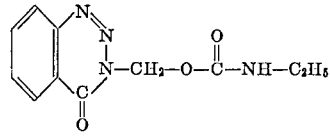

3-(hydroxymethyl)-1,2,3-benzotriazin-4(3H)-one (17.7 grams; 0.1 mole) was dissolved in 100 milliliters of dimethylformamide. To the resulting solution, there are added, all at once, 10.7 grams of ethyl isocyanate (0.15 mole) and 4 to 5 drops of triethylamine. The addition was carried out at a room temperature of about 22° C. Within a few minutes following the addition, the temperature of the resulting reaction mixture had risen to 39° C. The reaction mixture was permitted to stand at room temperature for about 18 hours. Thereafter, solvent and excess ethyl isocyanate reactant were removed by evaporation under subatmospheric pressure to separate the desired ((4 - oxo - 1,2,3 - benzotriazin-3(4H)-yl)methyl)ethylcarbamate product as a residue. This product residue, a brown crystalline solid material, was recrystallized from 100 milliliters of methanol. The recrystallized material existed as pale tan needles melting at 140–141° C.

EXAMPLE 2.—((4-OXO-1,2,3-BENZOTRIAZIN-3 (4H)-YL)METHYL) CYCLOHEXYLCARBAMATE 3-(hydroxymethyl)-1,2,3-benzotriazin-4(3H) - one and cyclohexyl isocyanate were reacted together, in the procedures of Example 1, to obtain the expected ((4-oxo-1,2,3-benzotriazin - 3(4H) - yl)methyl)cyclohexylcarbamate product. The product melts at 144–146° C.

EXAMPLE 3.—((6-IODO-4-OXO-1,2,3-BENZOTRIAZIN-3(4H)-YL)-METHYL)METHYLCARBAMATE

6 - iodo-3-(hydroxymethyl)-1,2,3-benzotriazin - 4(3H)-one and methyl isocyante were reacted together in the procedures of Example 1 to obtain the desired ((6-iodo-4-oxo-1,2,3-benzotriazin-3(4H) - yl)methyl)methyl - carbamate product, melting at 178–180° C.

EXAMPLE 4.—((4-OXO-1,2,3-BENZOTRIAZIN-3 (4H)-YL)METHYL)DIMETHYLCARBAMATE

Phosgene (9.9 grams; 0.1 mole) was added to 100 milliliters of toluene on an ice bath. The addition was carried out portionwise such that the mixture was maintained at temperatures of from 2 to 5° C. Following the addition, 3-(hydroxymethyl)-1,2,3-benzotriazin-3(4H) - one (17.7 grams; 0.1 mole) and thereafter N,N-dimethyl-aniline (12.1 grams; 0.1 mole) were sequentially added to the mixture. The addition was carried out portionwise, with stirring, and at temperatures of from 2 to 5° C. Stirring was continued for an additional half-hour at the same temperature.

Thereafter, dimethylamine (11.3 grams; 0.22 mole) was bubbled into the reaction mixture over a period of one-half hour; during this time, the resulting reaction mixture was stirred and was maintained at a temperature range of 5–10° C. The reaction of the dimethylamine with the chloroformate intermediate was observed to be exothermic, and stirring was continued for one hour following the completion of the dimethylamine addition. Subsequently, the reaction mixture was washed with 200 milliliters of water, and the washed reaction mixture subjected to evaporation under subatmospheric pressure to remove the toluene and to obtain the desired ((4-oxo-1,2,3-benzotriazin-3(4H) - yl)methyl)dimethylcarbamate product as a residue. The product residue, an amber-colored liquid, was crystallized a first time from 25 milliliters of methanol, and a second time from 10 milliliters of methanol. The product is a crystalline solid melting at 117–118.5° C.

EXAMPLE 5.—((4-OXO-1,2,3-BENZOTRIAZIN-3 (4H-YL)METHYL)CARBAMATE

Phosgene (9.9 grams; 0.1 mole) was dissolved in 200 milliliters of chloroform at a temperature of 0° C., and the resulting solution cooled to a temperature of about −40° C. Thereafter, 3-(hydroxymethyl)1,2,3-benzotriazin-3(4H)-one (17.7 grams; 0.1 mole) and triethylamine (10.1 grams; 0.1 mole) were added sequentially to the mixture. The addition of each was carried out portionwise, with stirring of the resulting reaction mixture, and the reaction mixture was maintained during the entire addition at a temperature of about −40° C. Stirring was continued for an additional one-half hour with the reaction mixture at about −40° C. The reaction mixture was slightly cloudy. Thereafter, ammonia (3.7 grams; 0.22 mole) was bubbled into the reaction mixture, with stirring, and with the temperature of the reaction mixture being maintained below −40° C. The ammonia addition required about one-half hour. Stirring of the reaction mixture was continued for another one-half hour, with the temperature of the mixture being permitted to rise to 0° C. As a result of the operation, the desired ((4-oxo-1,2,3 - benzotriazin-3(4H) - yl methyl) carbamate product was obtained as a precipitate in the reaction mixture. The product was separated by filtration and dried; it melted with decomposition at 179–185° C. The filtrate was washed with water to remove the by-product salt, and toluene removed by evaporation under subatmospheric pressure to obtain an additional product residue also melting with decomposition at 179–185° C. The two crops of product were combined and recrystallized from 100 milliliters of 2-ethoxyethanol. The recrystallized material was a white crystalline solid melting with decomposition at 180–185° C.

Other representative products of the present invention include the following:

From 3 - (hydroxymethyl)-1,2,3-benzotriazine-4(3H)-one and methyl isocyanate, ((4-oxo-1,2,3-benzotriazin-3(4H)-yl)methyl)methylcarbamate, melting at 150–152° C.

From 5 - ethyl-3-(hydroxymethyl)-1,2,3-benzotriazin-4(3H)-one (molecular weight of 205.2) phosgene, and N - methylaniline, ((5 - ethyl-4-oxo-1,2,3-benzotriazine-3(4H)-yl)methyl)N-methyl-N-phenylcarbamate, having a molecular weight of 338.4.

From 3 - (hydroxymethyl)-1,2,3-benzotriazin-4(3H)-one and isopropyl isocyanate, ((4-oxo-1,2,3-benzotriazin-3(4H)-yl)methyl)isopropylcarbamate, melting at 140–142° C.

From 8 - methyl-3-(hydroxymethyl)-1,2,3-benzotriazin-4(3H)-one and methyl isocyanate, ((8-methyl-4-oxo-1,2,3-benzotriazin - 3(4H) - yl)methyl)methylcarbamate, melting at 152–154° C.

From 7 - sec-butyl-3-(hydroxymethyl)-1,2,3-benzotriazin-4(3H)-one (molecular weight of 233.3), phosgene, and methylamine, ((7-sec-butyl-4-oxo-1,2,3-benzotriazin-3(4H)-yl)methyl)methylcarbamate, having a molecular weight of 290.3.

From 3-(hydroxymethyl)-1,2,3-benzotriazin-4(3H-one and n-butyl isocyanate, ((4-oxo - 1,2,3 - benzotriazin-3(4H)-yl)methyl)n-butylcarbamate, melting at 104-106° C.

From 7 - chloro-3-(hydroxymethyl)-1,2,3-benzotriazin-4(3H)-one and ethyl isocyanate, ((7-chloro-4-oxo-1,2,3-benzotriazin-3(4H)-yl)methyl)ethylcarbamate, melting at 187–189° C.

From 6 - methoxy-3-(hydroxymethyl)-1,2,3-benzotriazin-4(3H)-one and phenyl isocyanate, ((6-methoxy-4-oxo-1,2,3-benzotriazin - 3(4H) - yl)methyl)phenylcarbamate, having a molecular weight of 326.3.

From 6 - chloro-3-(hydroxymethyl)-1,2,3-benzotriazin-4(3H)-one and methyl isocyanate, ((6-chloro-4-oxo-1,2,3-benzotriazin - 3(4H) - yl)methyl)methylcarbamate, melting at 170–172° C.

From 8-n-propyl - 3 - (hydroxymethyl)-1,2,3-benzotriazin-4(3H)-one (molecular weight of 219.2), phosgene, and diethylamine, ((8-n-propyl-4-oxo-1,2,3-benzotriazin-3(4H)-yl)methyl)diethylcarbamate, having a molecular weight of 318.4.

From 3 - (hydroxymethyl) - 1,2,3 - benzotriazin-4(3H)-one and phenyl isocyanate, ((4-oxo-1,2,3-benzotriazin-3(4H)-yl)methyl)phenylcarbamate, melting at 192–195° C.

From 3 - (hydroxymethyl) - 1,2,3 - benzotriazin-4(3H)-one, phosgene, and N-cyclohexylaniline, ((4-oxo-1,2,3-benzotriazin - 3(4H)-yl)methyl)N-cyclohexyl-N-phenylcarbamate, having a molecular weight of 378.4.

From 3 - (hydroxymethyl) - 1,2,3 - benzotriazin-4(3H)-one, phosgene, and diethylamine, ((4-oxo-1,2,3-benzotriazin-3(4H)-yl)methyl)diethylcarbamate, a white crystalline solid melting at 83–85° C.

From 6 - n - butoxy - 3 - (hydroxymethyl)-1,2,3-benzotriazin-4(3H)-one (molecular weight of 249.3) and methyl isocyanate, ((6 - n - butoxy-4-oxo-1,2,3-benzotriazin-3(4H)-yl)methyl)methylcarbamate, having a molecular weight of 306.3.

From 6 - bromo - 3 - (hydroxymethyl)-1,2,3-benzotriazin-4(3H)-one (molecular weight of 256.1) and methyl isocyanate, ((6 - bromo-4-oxo-1,2,3-benzotriazin-3(4H)-yl)methyl)methylcarbamate, melting at 180–182° C.

From 6 - nitro - 3 - (hydroxymethyl)-1,2,3-benzotriazin4(3H)-one and methyl isocyanate, ((6-nitro - 4 - oxo-1,2,3-benzotriazin - 3(4H) - yl)methyl)methylcarbamate, melting with decomposition at 205–207° C.

Yet other representative products of the present invention are the following:

((6 - chloro - 4 - oxo - 1,2,3 - benzotriazin-3(4H)-yl)-methyl)ethylcarbamate, melting at 193–195° C.; ((5,6,7,8-tetrachloro-4-oxo-1,2,3-benzotriazin - 3(4H)-yl)methyl)-n-hexylcarbamate, molecular weight of 442.2; ((6-methoxy-4-oxo - 1,2,3 - benzotriazin-3(4H)-yl)methyl)methylcarbamate, an oil; ((6,8-dinitro-4-oxo-1,2,3-benzotriazin-3(4H) - yl)methyl)dimethylcarbamate, molecular weight of 338.2; ((8-chloro-4-oxo-1,2,3-benzotriazin-3(4H)-yl) methyl)methylcarbamate, melting at 186–188° C.; ((5,8-dimethoxy-4-oxo - 1,2,3 - benzotriazin-3(4H)-yl)methyl) cyclohexylcarbamate, molecular weight of 362.4; ((4-oxo-1,2,3 - benzotriazin-3(4H)-yl)methyl)n-propylcarbamate, melting at 102–104° C.; ((8-bromo - 5 - n - propyl-4-oxo-1,2,3-benzotriazin - 3(4H) - yl)methyl)phenylcarbamate, molecular weight of 417.3; ((6-chloro-4-oxo-1,2,3-benzotriazin - 3(4H) - yl)methyl)n - butylcarbamate, melting at 145–147° C.; ((6,7-dimethyl - 4 - oxo-1,2,3-benzotriazin-3(4H)-yl)methyl)diethylcarbamate, molecular weight of 304.4; ((5-chloro-4 - oxo - 1,2,3 - benzotriazin-3(4H)-yl) methyl)methylcarbamate, melting at 168–170° C.; ((8-methyl-6-nitro-4-oxo-1,2,3-benzotriazin - 3(4H)-yl)methyl)methylcarbamate, molecular weight of 293.2; ((6-chloro-4-4oxo - 1,2,3 - benzotriazin-3(4H)-yl)methyl)isopropylcarbamate, melting at 165–167° C.; ((6,8-dichloro-4-oxo - 1,2,3 - benzotriazin-3(4H)-yl)methyl)n-butylcarbamate, melting at 151–153° C.; ((7-chloro-4-oxo-1,2,3-benzotriazin-3(4H)-yl)methyl)methylcarbamate, melting at 198–200° C.; and ((6,7,8-trichloro-4-oxo-1,2,3-benzotriazin-3(4H)-yl)methyl)N - methyl - N - tertoctylcarbamate, molecular weight of 449.8.

Products hereof are useful as insecticides when employed in insecticidal amounts. Good results are obtained with methods utilizing compositions containing from about 100 to 10,000 parts of one or more of the products hereof per million by weight. In representative operations, (6 - chloro - 4 - oxo-1,2,3-benzotriazin-3(4H)-yl)methyl) methylcarbamate gives good controls and kills of American cockroach when such are contacted with aqueous compositions containing the named compound at concentrations of 1000 parts per million by weight.

As previously set forth, products of the present invention are active central nervous system depressants and, as such, are useful for studying and controlling the behavior of animals such as mice, rats, dogs, and monkeys. Good results are obtained when employing from about 10 to about 800 or more milligrams per kilogram of body weight of one or more of the compounds. In such usage the product can be administered orally, intraperitoneally, or subcutaneously and generally, in cooperation with any pharmaceutically acceptable carrier or excipient such as starch, lactose, corn oil, peanut oil, propylene glycol, glycerine and so forth. The products which are generally preferred for this use are those of the formula

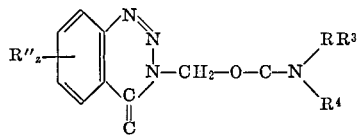

wherein $z$, as previously defined, represents 0, 1, or 2; $R^3$ represents hydrogen, loweralkyl, or cyclohexyl; and $R^4$ represents $R^3$ or phenyl. Even more preferred are those wherein $z$ is 1 and $R''$ is chloro or those wherein $R^3$ and $R^4$ are hydrogen and methyl, respectively.

In representative operations, 100 milligrams per kilogram of ((4 - oxo - 1,2,3-benzotriazin-3(4H)-yl)methyl) methylcarbamate is administered intraperitoneally to each of several mice. Subsequent to this administration the mice are each administered d-amphetamine sulfate in amounts known to induce hysteria or marked excitement. The mice are then confined for observation in groups in a relatively small space. The mice administered the active compound are found to be more tranquil and are found to have survival times which are longer than those of check mice similarly treated except not administered the active compound. Also, intraperitoneal administration to a group of mice of 100 milligrams per kilogram of ((7-chloro - 4 - oxo - 1,2,3 - benzotriazin-3(4H)-yl)methyl) methylcarbamate affords protection against the convulsions normally induced by a subsequent electric shock subsequently applied to the mice. The compounds also exhibit muscle relaxant activity. For an example, ((7-chloro - 4 - oxo - 1,2,3 - benzotriazin-3(4H)-yl)methyl) methylcarbamate is administered subcutaneously to a group of ten mice at the rate of 100 milligrams per kilogram of body weight. Subsequently, a normally lethal dose of strychnine sulfate is administered subcutaneously to each mouse. All of the mice survive.

As previously noted, products of the present invention are useful as herbicides. Those products which are generally preferred for this use are those of the formula

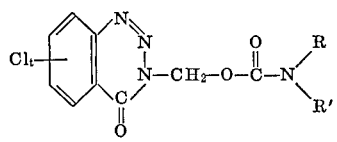

wherein $t$ represents an integer of from 1 to 4, both inclusive; and R and R' are as previously defined, except that at least one of R and R' comprises a minimum of four carbon atoms. For this herbicidal use, the unmodified compounds can be employed. However, the present invention also encompasses the use of the compounds together with an adjuvant. Hence, the compounds can be dispersed upon a finely divided solid and the resulting preparation employed as a dust. Also, the compounds can be dispersed in water with the aid of a wetting agent and the resulting aqueous suspension employed as a spray. In other procedures, the products can be employed as constituents of organic liquid compositions, oil-in-water or water-in-oil emulsions or water dispersions with or without the addition of wetting, dispersing or emulsifying agents. Good results accrue when employing herbicidal amounts of the thus active compounds. In compositions (and methods employing such compositions), the herbicidal amounts range from about 10 to 10,000 parts of the compound or mixtures thereof per million parts by weight.

The substituted methanol compound which is employed as a starting material in the preparation of the products of the present invention, and which is of the following structural formula:

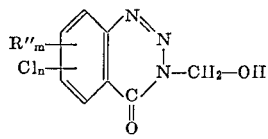

is prepared by a two-step reaction. This reaction comprises diazotization of an anthranilamide to obtain a 1,2,3-benzotriazin-4(3H)-one which is then treated with formaldehyde to obtain the desired starting materials:

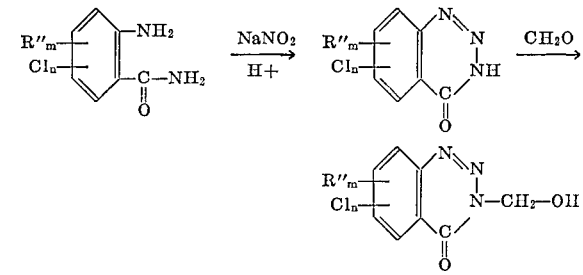

The diazotization and the treatment with formaldehyde are carried out in standard procedures.

Those starting materials which are of the formula

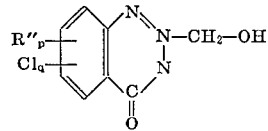

wherein $q$ represents an integer independently selected from the group consisting of 0, 3, and 4, and, $q$ being an integer other than 0, $p$ represents 0, and, $q$ being 0, $p$ represents an integer of from 1 to 2, both inclusive, constitute a new class of compounds. This class designates two groups of compounds: those in which the benzotriazine ring bears from 3 to 4 chlorine atoms as substituents:

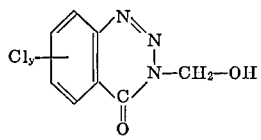

wherein $y$, as previously defined, represents 3 or 4, and those in which the benzotriazine ring bears from 1 to 2 substituents:

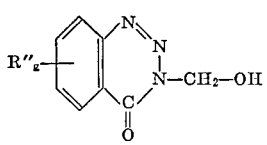

wherein $g$ represents 1 or 2. As noted, above, these specified starting materials are prepared by treatment with formaldehyde in standard procedures. In these procedures, the 1,2,3-benzotriazin-4(3H)-one is mixed with an aqueous formaldehyde solution, such as a 30 to 40 percent solution; conveniently, the reaction is carried out at room temperatures or at higher temperatures, such as at temperatures up to reflux. The reaction mixture can be further diluted with water. Good results are obtained when employing the 1,2,3-benzotriazin-4(3H)-one compound and formaldehyde in amounts representing a large excess, such as a ten-fold excess, of the formaldehyde. The desired materials are crystalline solid materials which can be separated from the reaction mixture by filtration. Purification, if desired, can be carried out in conventional procedures, such as recrystallization, washing with water, and the like.

In a representative preparation, 6-bromo-1,2,3-benzotriazin-4(3H)-one (15.8 grams; 0.07 mole) was mixed with 100 milliliters of 36–38 percent aqueous formaldehyde and 100 milliliters of water. The resulting reaction mixture was heated with stirring to reflux temperature and maintained thereat for 15 minutes. Thereafter, the reaction mixture was cooled with an ice bath to precipitate the desired 6-bromo-3-(hydroxymethyl)-1,2,3 - benzotriazin-4(3H)-one product. The product was separated from the reaction mixture by filtration and the separated product washed with a small portion of cold water and then dried in an oven at 60° C. The product melted at 143–146° C.

Other compounds prepared in accordance with these same procedures include the following:

6 - iodo-3-(hydroxymethyl)-1,2,3-benzotriazin-4(3H)-one, melting with decomposition at 163–165° C.;

6,7,8 - trichloro-3-(hydroxymethyl)-1,2,3-benzotriazin-4(3H)-one, molecular weight of 280.5;

6-nitro-3-(hydroxymethyl)-1,2,3-benzotriazin - 4(3H)-one, melting at 136–138° C.;

6,8-dinitro - 3 - (hydroxymethyl)-1,2,3-benzotriazin-4(3H)-one, molecular weight of 267.2;

5 - chloro-3-(hydroxymethyl) - 1,2,3, - benzotriazin-4(3H)-one, melting at 125–128° C.;

8-bromo-6-n-propyl - 3 - (hydroxymethyl)-1,2,3-benzotriazin-4(3H)-one, molecular weight of 298.2;

6 - methoxy - 3 - (hydroxymethyl)-1,2,3-benzotriazin-4(3H)-one, melting at 93–102° C.;

7-n-butyl - 3 - (hydroxymethyl) - 1,2,3 - benzotriazin-4(3H)-one, having a molecular weight of 233.3;

5,6,7,8-tetrachloro-3-(hydroxymethyl) - 1,2,3 - benzotriazin-4(3H)-one, molecular weight of 315;

8-chloro - 3 - (hydroxymethyl) - 1,2,3 - benzotriazin-4(3H)-one, melting with decomposition at 165–167° C.;

6,7-dimethyl - 3 - (hydroxymethyl)-1,2,3-benzotriazin-4(3H)-one, molecular weight of 205.2;

6-isopropoxy - 3 - (hydroxymethyl)-1,2,3-benzotriazin-4(3H)-one, having a molecular weight of 235.2;

6,8-dichloro - 3 - (hydroxymethyl)-1,2,3-benzotriazin-4(3H)-one, melting with decomposition at 162–168° C.;

5,8 - dimethoxy - 3 - (hydroxymethyl)-1,2,3-benzotriazin-4(3H)-one, molecular weight of 237.2;

8 - methyl - 3 - (hydroxymethyl)-1,2,3-benzotriazin-4(3H)-one, melting at 160–162° C.;

8-methyl-6-nitro - 3 - (hydroxymethyl)-1,2,3-benzotriazin-4(3H)-one, molecular weight of 204.2;

6-chloro - 3 - (hydroxymethyl) - 1,2,3 - benzotriazin-4(3H)-one, having a molecular weight of 205.2; and 7 - chloro - 3 - (hydroxymethyl)-1,2,3-benzotriazin-4(3H)-one, melting at 144–146° C.

These starting materials of the specified structural formula:

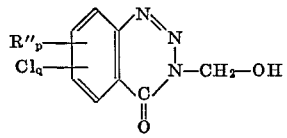

are useful, as previous set forth, as intermediates in preparing the ultimate products of the present invention. In addition, they can be employed as bactericides for the control of such organisms as Bacillus subtilis; Salmonella typhosa; Aspergillus terreus; Candida pelliculosa; Pullularia pullulans; Rhizopus nigricans; and the like. For this use, the unmodified compounds can be employed. However, the present invention also encompasses the use of the compounds together with an adjuvant. Hence, the compounds can be dispersed upon a finely divided solid and the resulting preparation employed as a dust. Also, the compounds can be dispersed in water with the aid of a wetting agent and the resulting aqueous suspension employed as a spray. In other procedures, the products can be employed as constituents of organc liquid compositions, oil-in-water or water-in-oil emulsions or water dispersions with or without the addition of wetting, dispersing or emulsifying agents. In representative practices, 6-chloro - 3 - (hydroxymethyl)-1,2,3-benzotrazin-4(3H)-one gave complete inhibition of the growth of Aspergillus terreus when incorporated in a culture medium in an amount representing a concentration of 0.05 percent.

I claim:
1. Compound of the formula

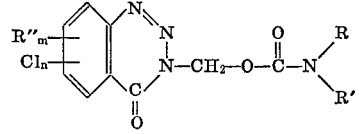

wherein R represents hydrogen, alkyl of 1–8 carbon atoms, or cyclohexyl; R' represents R or phenyl; each R" independently represents loweralkyl, loweralkoxy, halo, or nitro; $n$ represents 0, 3, or 4; and $n$ being an integer other than 0, $m$ represents 0 and, $n$ being 0, $m$ represents an integer of from 0 to 2, both inclusive.

2. The compound of claim 1 wherein $n$ represents 0, $m$ represents 1, and R" represents chloro.

3. The compound of claim 2 which is ((6-chloro-4-oxo-1,2,3 - benzotriazin-3(4H)-yl)-methyl)methylcarbamate.

4. The compound of claim 2 which is ((7-chloro-4-oxo-1,2,3 - benzotriazin-3(4H)-yl)-methyl)methylcarbamate.

5. The compound of claim 1 wherein each of $n$ and $m$ represents 0.

6. The compound of claim 5 which is ((4-oxo-1,2,3-benzotriazin-3(4H)-yl)-methyl)methylcarbamate.

7. The compound of claim 1 wherein $n$ represents 3 or 4.

8. Compound of the formula

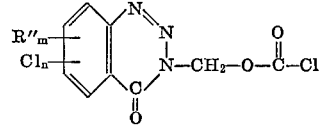

wherein each R" independently represents loweralkyl, loweralkoxy, halo, or nitro; $n$ represents 0, 3, or 4; and $n$ being 3 or 4, $m$ represents 0, and, $n$ being 0; $m$ represents an integer of from 0 to 2.

References Cited

UNITED STATES PATENTS

| | | | |
|---|---|---|---|
| 2,914,530 | 11/1959 | Schrader et al. | 260—248 |
| 3,120,523 | 2/1964 | Petersen et al. | 260—248 |
| 3,163,646 | 12/1964 | Herlinger et al. | 260—248 XR |
| 3,325,492 | 6/1967 | Schrader et al. | 260—248 |

HENRY R. JILES, Primary Examiner

JOHN M. FORD, Assistant Examiner

U.S. Cl. X.R.

71—93; 424—249